US011294051B2

(12) United States Patent
Barker et al.

(10) Patent No.: US 11,294,051 B2
(45) Date of Patent: Apr. 5, 2022

(54) ULTRASONIC MEASUREMENT DEVICE

(71) Applicant: Creative Racing Products, LLC, Oxford, CT (US)

(72) Inventors: Don Barker, Watertown, CT (US); Brett Barker, Watertown, CT (US); Elik Dvorkin, Woodbridge, CT (US)

(73) Assignee: CREATIVE RACING PRODUCTS, LLC, Oxford, CT (US)

( * ) Notice: Subject to any disclaimer, the term of this patent is extended or adjusted under 35 U.S.C. 154(b) by 429 days.

(21) Appl. No.: 15/969,218

(22) Filed: May 2, 2018

(65) Prior Publication Data
US 2018/0321380 A1 Nov. 8, 2018

Related U.S. Application Data

(60) Provisional application No. 62/594,807, filed on Dec. 5, 2017, provisional application No. 62/500,137, filed on May 2, 2017.

(51) Int. Cl.
*G01S 15/10* (2006.01)
*G01S 7/52* (2006.01)
(Continued)

(52) U.S. Cl.
CPC .......... *G01S 15/10* (2013.01); *G01S 7/52006* (2013.01); *G01S 7/52015* (2013.01); *G01S 7/6209* (2013.01); *G01S 15/88* (2013.01)

(58) Field of Classification Search
None
See application file for complete search history.

(56) References Cited

U.S. PATENT DOCUMENTS 4,015,319 A * 4/1977 Levine .................. B06B 1/0603
29/25.35
4,080,574 A * 3/1978 Loosemore ............. G01F 1/667
327/19
(Continued)

FOREIGN PATENT DOCUMENTS

DE 2704511 8/1978
DE 0216098 11/1983
(Continued)

OTHER PUBLICATIONS

MaxBotix® Inc., HRLV-MaxSonar®—EZ™ Series High Resolution, Precision, Low Voltage Ultrasonic Range Finder MB1003, MB1013, MB1023, MB1033, MB10435, Copyright 2005-2014 MaxBotix Incorporated (Year: 2014).*
(Continued)

*Primary Examiner* — Isam A Alsomiri
*Assistant Examiner* — Jonathan D Armstrong
(74) *Attorney, Agent, or Firm* — Ware, Fressola, Maguire & Barber LLP

(57) ABSTRACT

A measuring device is provided, having a housing having a circuit board and processor; a first transducer arranged on a surface of the housing and configured to transmit an ultrasonic pulse towards a target surface; a second transducer adjacent to the first transducer configured to receive a reflection of the ultrasonic pulse off of the target surface; and a thermistor on the surface of the housing adjacent to the first and second transducers and configured to measure air temperature surrounding the device. The processor of the device is configured to measure a time duration between transmitting the ultrasonic pulse by the first transducer and receiving the reflection of the ultrasonic pulse by the second transducer, and to determine a distance between a ground surface upon which the device is resting and the target surface based (Continued)

at least upon the measured time duration and the measured air temperature.

13 Claims, 5 Drawing Sheets

(51) Int. Cl.
  *G01S 7/62* (2006.01)
  *G01S 15/88* (2006.01)

(56) References Cited

U.S. PATENT DOCUMENTS

| | | | | |
|---|---|---|---|---|
| 4,084,149 | A * | 4/1978 | Driver | G01S 15/06 |
| | | | | 109/19 |
| 4,199,246 | A * | 4/1980 | Muggli | G01S 15/104 |
| | | | | 352/140 |
| 4,397,186 | A * | 8/1983 | Phelan | G01N 29/2412 |
| | | | | 73/584 |
| 4,759,775 | A * | 7/1988 | Peterson | A61M 1/36 |
| | | | | 210/188 |
| 4,811,250 | A | 3/1989 | Steber et al. | |
| 5,295,073 | A | 3/1994 | Celette | |
| 5,418,758 | A * | 5/1995 | Webster | G01B 17/04 |
| | | | | 367/101 |
| 5,583,797 | A | 12/1996 | Fluegge et al. | |
| 5,583,828 | A * | 12/1996 | Arai | B65H 23/0204 |
| | | | | 226/45 |
| 5,612,905 | A | 3/1997 | Maillart et al. | |
| 5,760,938 | A | 6/1998 | Hodge | |
| 5,973,273 | A * | 10/1999 | Tai | G01G 19/08 |
| | | | | 177/1 |
| 6,075,589 | A | 6/2000 | Muller et al. | |
| 6,763,594 | B2 | 7/2004 | Foreman | |
| 6,912,477 | B2 | 6/2005 | Murray | |
| 7,120,524 | B2 | 10/2006 | Srack et al. | |
| 7,121,142 | B2 | 10/2006 | Chevret et al. | |
| 7,535,558 | B2 | 5/2009 | Uffenkamp et al. | |
| 7,668,045 | B2 * | 2/2010 | Lee | G01S 11/16 |
| | | | | 367/98 |
| 7,796,782 | B1 * | 9/2010 | Motamedi | G01C 1/00 |
| | | | | 382/106 |
| 8,838,405 | B2 | 9/2014 | Kitazawa et al. | |
| 9,182,224 | B2 | 11/2015 | Lokshyn | |
| 9,513,602 | B1 * | 12/2016 | Russell | G04B 23/02 |
| 9,545,542 | B2 * | 1/2017 | Binder | A63B 71/0622 |
| 10,078,003 | B2 * | 9/2018 | Gurumohan | G01F 23/2962 |
| 2002/0128556 | A1 * | 9/2002 | Nakamura | A61B 8/4483 |
| | | | | 600/459 |
| 2003/0090960 | A1 * | 5/2003 | Kayano | G01S 15/872 |
| | | | | 367/96 |
| 2003/0144814 | A1 * | 7/2003 | Hama | G06F 3/03545 |
| | | | | 702/159 |
| 2003/0201880 | A1 * | 10/2003 | Lu | B60C 23/066 |
| | | | | 340/443 |
| 2005/0200487 | A1 * | 9/2005 | O'Donnell | G08B 21/0266 |
| | | | | 340/573.1 |
| 2006/0168827 | A1 | 8/2006 | Roethlisberger | |
| 2007/0038091 | A1 * | 2/2007 | Shiki | A61B 8/4494 |
| | | | | 600/437 |
| 2007/0044331 | A1 * | 3/2007 | Yung | G01C 15/004 |
| | | | | 33/286 |
| 2009/0295622 | A1 * | 12/2009 | Anderson | G08G 5/0082 |
| | | | | 342/71 |
| 2010/0123602 | A1 * | 5/2010 | Schmid | G08G 1/042 |
| | | | | 340/932.2 |
| 2011/0248861 | A1 * | 10/2011 | Corrado | G01B 21/26 |
| | | | | 340/666 |
| 2012/0111089 | A1 * | 5/2012 | Martin | B60C 23/0408 |
| | | | | 73/1.42 |
| 2013/0066590 | A1 * | 3/2013 | Kasama | G01B 17/06 |
| | | | | 702/158 |
| 2013/0162461 | A1 * | 6/2013 | Lucking | G01S 15/931 |
| | | | | 342/70 |
| 2013/0345937 | A1 * | 12/2013 | Strelioff | A01D 41/145 |
| | | | | 701/50 |
| 2015/0355012 | A1 * | 12/2015 | Gurumohan | H04Q 9/00 |
| | | | | 702/55 |
| 2018/0143062 | A9 * | 5/2018 | Gurumohan | H04B 10/114 |
| 2018/0292506 | A1 * | 10/2018 | Bjorkengren | G01S 5/30 |
| 2019/0122056 | A1 * | 4/2019 | Tran | G01S 7/521 |
| 2019/0154439 | A1 * | 5/2019 | Binder | G01S 15/08 |

FOREIGN PATENT DOCUMENTS

| | | |
|---|---|---|
| EP | 0598809 | 2/1999 |
| EP | 1073915 | 1/2007 |
| EP | 0943890 | 2/2007 |
| EP | 1798515 | 9/2015 |
| GB | 2075185 | 3/1984 |
| GB | 2360589 | 9/2001 |
| WO | 2010100472 | 9/2010 |
| WO | 2013079395 | 6/2013 |
| WO | 2015044277 | 4/2015 |
| WO | 2015186150 | 12/2015 |

OTHER PUBLICATIONS

"Sales Advice," MoTec, motec.com, May 2017, http://www.motec.com/salesadvice-US/rental/.

"Current Range," MoTec, motec.com, Sep. 28, 2016, https://web.archive.org/web/20160928035145/http://www.motec.com/dataanalysis-currentrange/dataanalysis-directory/.

"Ultrasonic Level Sensors," APG, apgsensors.com, May 2017, https://www.apgsensors.com/lp/ultrasonic-level-sensors.

"Steelman 97202 Wireless ChassisEAR Diagnostic Device Kit," Amazon, amazon.com, Apr. 2, 2004, https://www.amazon.com/STEELMAN-97202-Wireless-ChassisEAR-Diagnostic/dp/B00123J79O/.

"Laser Ride Height System (LRHS-1)," techmor.com, 2017, https://www.techmore.com/lrhs-1-laser-ride-height-system.

"LRHS-1 Laser Ride Height System User Manual," Techmore, Inc., Rev. C, Jul. 24, 2013, 10 pages.

* cited by examiner

ULTRASONIC MEASUREMENT DEVICE

CROSS-REFERENCE TO RELATED APPLICATIONS

The present application claims the benefit of U.S. Provisional Patent Application No. 62/500,137 filed on May 2, 2017 and U.S. Provisional Patent Application No. 62/594,807 filed on Dec. 5, 2017, both of which are hereby incorporated by reference in their entireties.

BACKGROUND OF THE INVENTION

In automobile racing, one of the critical measurements that must be taken during car setup is the height of the chassis at all four corners of the car. This height has important effects on the handling of the vehicle and is critical to the design of car's suspension. The more accurately this is controlled, the better the handling will be. It is also critical to know what these measurements are from race track to race track. One current practice is to use a manually operated gauge to make this critical measurement. The use of this device requires kneeling on the ground and reading the height by eye. This process is not convenient, physically comfortable, or accurate.

SUMMARY OF THE INVENTION

The present invention relates to an ultrasonic chassis height measurement (CHMS) device that is placed under the chassis of an automobile to perform this measurement and relay the measurement wirelessly to a mobile device or computer. The present invention further relates to a system for measuring the height of an automobile chassis comprising four measurement devices (one for each corner of the automobile) and at least one mobile device or computer, comprising a processor and a memory stored with an application that handles data retrieval and/or acquisition, display and storage.

The goal is for the measurement device to be relatively inexpensive. The measurement device should preferably have a measurement resolution of $\frac{1}{32}$ inch. The minimum measurement distance should be 1.5-2 inches or less from ground level.

The device of the present invention uses sound waves to measure distance, and more specifically an ultrasonic transducer, which can transmit and receive ultrasonic pulses. The transducer is mounted to the device in such a way that a measurement can be taken from the top of the transducer to the bottom of the frame rail (chassis). Taking into account the height of the transducer and amount of electrical wires that need to be safely routed to the circuit board, the mechanical design is optimized to be the lowest possible height, leaving approximately 0.868-1.0 inches between the top of the transducer and the bottom of the frame rail (chassis).

When sound is transmitted from the transducer, the transducer needs to "ring down," or have vibrations below a specific value, so that the transducer can receive the reflected sound wave back from the object it was reflected off of. The distance between the transducer and the object can be determined based on the speed of sound through air and the temperature. If the transducer cannot "ring down" in time to receive the reflected sound, then one cannot discern between the "ringing" and the reflected sound wave. Therefore, the length of time it takes to "ring down," or for the transducer to become below a specific value, is directly related to how close to the transducer one can measure or the minimum measuring distance.

Because a single transducer may take too long to "ring down" after transmitting the sound wave, the device of the present invention comprises two transducers. A first transducer is provided to transmit the signal, and a second transducer is provided to receive that signal after the signal has reflected off the object to measure. As a result, the transducer receiving the signal does not need time to "ring down" because the receiving transducer never "rang" in the first place.

The distance between the two transducers is important as well. If the transducers are too close, then the receiving transducer can receive the vibrations from the transmitting transducer. If the distance between transducers is too great, there are adverse effects, including a decrease in accuracy and repeatability due to the extra angle and extra distance the sound waves need to reflect off the object and travel. The distance between the transducers of the present invention has been optimized in view of these considerations and to provide the combination needed to measure accurately a height off the ground of approximately 1.5 inches or less. The device also comprises a laser pointer to help the user locate where the sound waves will be measuring, so the user can place the unit in the exact desired location.

The device also comprises a printed circuit board with batteries and a user interface (UI) button. The UI button on the top of the measurement device may allow for the user to zero the measurement device, along with other functions as well. For example, when the racecar is being setup, it will most likely be on top of scales off the floor. If the measurement device is placed on the floor and measures up to the frame rail, that distance will be measured. But to see the distance the racecar is actually off of the scale, then a straight edge can be put on the top of the scale and the UI button can be "triple-clicked" with the device under the straight edge, and the unit will zero off of the surface of the straight edge. Then when a measurement is taken, the displayed value is the height the racecar frame is off the scale. The UI button can also be used to light up the laser pointer for positioning the measurement device under the racecar frame accurately. For example, pressing and holding the UI button can turn on the laser pointer, and releasing the UI button will turn off the laser pointer. A single click of the UI button can wake up the measurement device from a sleep state and five clicks of the UI button can turn off the unit. This single UI button has multiple functions. In alternative embodiments of the invention, the different functions of the device that can be initiated using the UI button can be performed using different actuation sequences or patterns than those referenced above.

The device of the present invention may also comprise a light emitting diode (LED), which can display multiple states of the device, for example, through a number of blinks per minute and/or the length of each blink.

The device of the present invention also comprises an external thermistor close to the sensors. Sound travels through air at different speeds depending on the temperature of the air through which the sound wave travels. To obtain more accurate measurements, the temperature is sensed near the ultrasonic transducers. When triggered for a measurement, the device first measures the temperature near the sensors to first know what algorithm to calculate with. The device then takes several (e.g., sixty) measurements of the time it takes for the sound wave to travel between the sensor and target. The processor will discard the ten longest times and the ten shortest times and take an average of the remaining forty. The average time is then converted into a distance using calculations of the speed of sound at the measured temperature. This process transpires in approximately two and a half seconds.

The overall height of the device is preferably less than two inches and just below the minimum measuring capabilities of the transducers within the system.

In accordance with a first aspect of the invention, a device is provided for measuring the height of an automobile chassis. The device comprises a housing comprising a circuit board comprising a processor, a first transducer arranged on a surface of the housing and configured to transmit an ultrasonic pulse towards a target surface, a second transducer arranged adjacent to the first transducer configured to receive a reflection of the ultrasonic pulse off of the target surface, a laser pointer arranged on the surface of the housing proximal to the first and second transducers and configured to generate a visible laser directed towards the target surface, a user interface button arranged on the surface of the housing, and a thermistor arranged on the surface of the housing adjacent to the first and second transducers and configured to measure air temperature surrounding the device. The processor of the device is configured to measure a time duration between transmitting the ultrasonic pulse by the first transducer and receiving the reflection of the ultrasonic pulse by the second transducer, and is further configured to determine a distance between a ground surface upon which the device is resting and the target surface based at least upon the measured time duration and the measured air temperature. The distance corresponds to the height of the automobile chassis.

In accordance with an embodiment of the device of the first aspect of the invention, the first transducer and second transducer are mounted in an acoustically dampening material.

In accordance with a further embodiment of the device of the first aspect of the invention, the circuit board further comprises a light emitting diode visible on the surface of the housing.

In accordance with a further embodiment of the device of the first aspect of the invention, the housing further comprises a battery holder configured to receive one or more batteries to power the device. The device may further comprise a bottom plate configured to be attachable to the housing and detachable from the housing to provide access to the battery holder and the circuit board.

In accordance with a further embodiment of the device of the first aspect of the invention, the first transducer is configured to transmit the ultrasonic pulse at a frequency of approximately 300 kHz.

In accordance with a further embodiment of the device of the first aspect of the invention, the second transducer is physically separated from the first transducer to reduce vibrations from the transmission of the ultrasonic pulse by the first transducer affecting the second transducer.

In accordance with a further embodiment of the device of the first aspect of the invention, the first transducer is configured to transmit a predetermined number of ultrasonic pulses. For each of the predetermined number of ultrasonic pulse transmissions, the processor is configured to measure the time duration between transmitting the ultrasonic pulse by the first transducer and receiving the reflection of the ultrasonic pulse by the second transducer, to determine a measured time duration for each of the predetermined number of ultrasonic pulse transmissions, and the distance between the ground surface and the target surface is determined based on at least a plurality of the measured time durations for the predetermined number of ultrasonic pulse transmissions.

In accordance with a further embodiment of the device of the first aspect of the invention, a height of the device between the first and second transducers and a base surface of the device to be placed on the ground surface is no greater than approximately 0.65 inches.

In accordance with a further embodiment of the device of the first aspect of the invention, the device is configured to communicate one or more of the measurements of air temperature, time duration and distance to a mobile device or computer.

In accordance with a further embodiment of the device of the first aspect of the invention, the target surface is a surface of the automobile chassis.

In accordance with a second aspect of the invention, a device is provided for measuring the height of an automobile chassis. The device comprises a housing comprising a circuit board comprising a processor; a first transducer arranged on a surface of the housing and configured to transmit an ultrasonic pulse towards a target surface; and a second transducer arranged adjacent to the first transducer configured to receive a reflection of the ultrasonic pulse off of the target surface. The processor of the device is configured to measure a time duration between transmitting the ultrasonic pulse by the first transducer and receiving the reflection of the ultrasonic pulse by the second transducer, and a distance between a ground surface upon which the device is resting and the target surface is determined based at least upon the measured time duration, wherein the distance corresponds to the height of the automobile chassis.

In accordance with an embodiment of the device of the second aspect of the invention, the device further comprises a thermistor arranged on the surface of the housing adjacent to the first and second transducers and configured to measure air temperature surrounding the device and the distance between the ground surface and the target surface is further determined based at least upon the measured air temperature.

In accordance with a further embodiment of the device of the second aspect of the invention, the device further comprises a laser pointer arranged on the surface of the housing proximal to the first and second transducers and configured to generate a visible laser directed towards the target surface.

In accordance with a further embodiment of the device of the second aspect of the invention, the device further comprises a user interface button arranged on the surface of the housing configured to control one or more operations of the device.

In accordance with a further embodiment of the device of the second aspect of the invention, a height of the device between the first and second transducers and a base surface of the device to be placed on the ground surface is no greater than approximately 0.65 inches.

In accordance with a further embodiment of the device of the second aspect of the invention, the second transducer is physically separated from the first transducer to reduce vibrations from the transmission of the ultrasonic pulse by the first transducer affecting the second transducer.

In accordance with a third aspect of the invention, a system is provided comprising a plurality of measurement devices for measuring the height of an automobile chassis. Each measurement device comprises a housing comprising a circuit board comprising a processor, a first transducer arranged on a surface of the housing and configured to transmit an ultrasonic pulse towards a target surface, a second transducer arranged adjacent to the first transducer configured to receive a reflection of the ultrasonic pulse off of the target surface, and a thermistor arranged on the surface of the housing adjacent to the first and second transducers and configured to measure air temperature surrounding the measurement device. The processor of each of the measurement devices is configured to measure a time duration between transmitting the ultrasonic pulse by the first transducer and receiving the reflection of the ultrasonic pulse by the second transducer. The system further comprises a mobile device or computer in communication with the each of the plurality of measurement devices and comprising a memory, a processor and a display screen. The measurement devices and/or the mobile device or computer are further configured to determine a distance between a ground surface upon which each measurement device is resting and the target surface based at least upon the measured time duration and the measured air temperature, wherein the distance corresponds to the height of the automobile chassis.

In accordance with an embodiment of the system of the third aspect of the invention, the plurality of measurement devices comprises four measurement devices and each measurement device is configured to measure the height of the automobile chassis at one of four corners of the automobile; and actuation of a user interface button of the mobile device or computer is configured to initiate the transmission of the predetermined number of ultrasonic pulses.

In accordance with a further embodiment of the system of the third aspect of the invention, the processor of each of the plurality of measurement devices is configured to measure time duration between transmitting the ultrasonic pulse by the first transducer of the respective measurement device and receiving the reflection of the ultrasonic pulse by the second transducer of the respective measurement device, and is further configured to determine the distance between the ground surface upon which the respective measurement device is resting and the target surface, based at least upon the measured time duration and the measured air temperature. Each of the plurality of measurement devices is configured to transmit the determined distances to the mobile device or computer. The memory of the mobile device or computer is configured to store the determined distances together with associated information including one or more of a date of measurement, a location of measurement and an identification of the automobile.

DETAILED DESCRIPTION OF THE INVENTION

The present invention will now be described with reference made to FIGS. 1-4.

Figure 1:
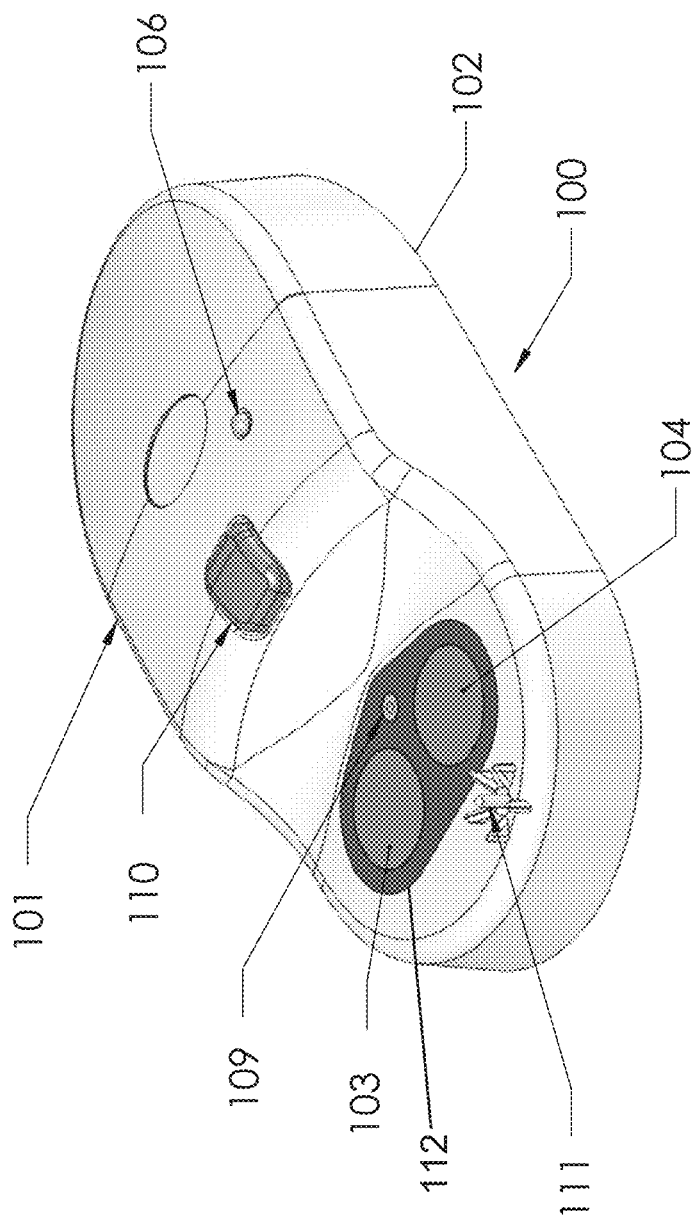
FIG. 1 shows a top perspective view of a measurement device according to an embodiment of the invention.
Figure 2:
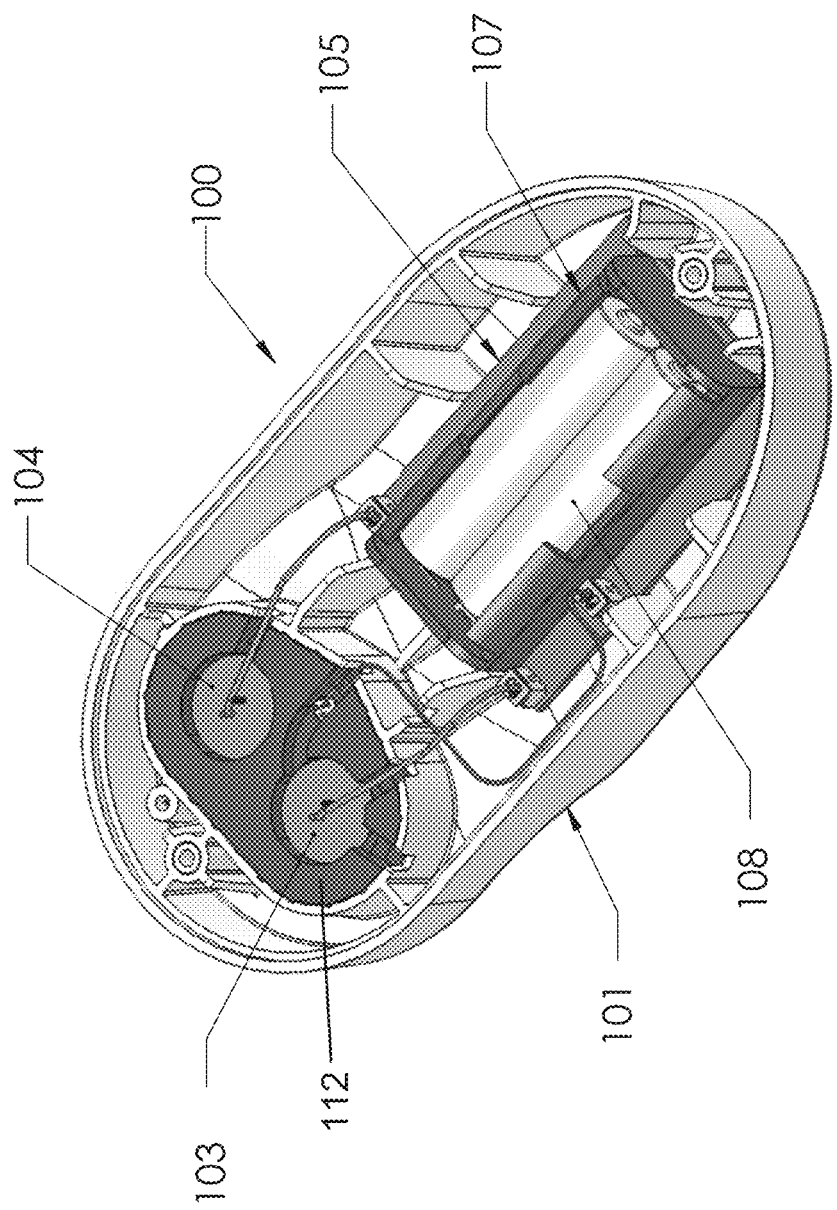
FIG. 2 shows a bottom perspective view of a measurement device with the bottom plate removed according to an embodiment of the invention.

As shown for example in FIG. 1, the measurement device 100 of the present invention comprises a housing 101 and a bottom plate 102. In a preferred embodiment, the housing 101 is a plastic housing and the bottom plate 102 is made of stainless steel. Two ultrasonic transducers 103, 104 are mounted to a top surface of the measurement device 100 in an acoustically dampening material 112, and serve as a transmitter and receiver of ultrasonic waves. The measurement device 100 also includes a circuit board 105, which is accessible from the bottom of the measurement device 100 and contains a light emitting diode (LED) 106, a switch, a processor, circuitry and a printed circuit board (PCB) antenna. A battery holder 107 provides a location for receiving batteries 108 to power the measurement device 100 and each of its components, including the circuit board 105, the transducers 103, 104, the thermistor 111, the laser pointer 109 and LED 106. In a preferred embodiment, the measurement device 100 is powered by two AAA batteries 108, and the battery holder 107 is configured to receive two AAA batteries 108. The bottom plate 102 of the measurement device 100 can be removed from the device to enable access to the circuit board 105 and batteries 108, as shown for example in FIG. 2.

A low-power diode laser pointer 109 is configured proximal to the transducers 103, 104 (e.g., along a centerline of the measurement device 100) in order to allow the user to ensure the measurement device 100 is aligned with the target. When actuated, for example using the user interface (UI) button 110, the laser pointer 109 generates a visible laser beam that indicates the surface location at which the laser pointer 109 and transducers 103, 104 are aimed. The measurement device 100 may also comprise a thermistor 111 to measure the temperature of the air surrounding the measurement device 100, as shown for example in the measurement devices 100 of FIGS. 1 and 4. The thermistor 111 may be positioned in close proximity to the transducers 103, 104 in order to measure the air temperature in the area around the transducers 103, 104. The measurement device 100 is ergonomic in order to improve its usability.

A rangefinder is a device that measures distance. Fundamentally, a rangefinder implementation must measure the amount of time it takes a signal to travel from the device to an object being measured and back, which is referred to as time of flight ("TOF"). As such, a system must include a signal transmitter, an object off of which to reflect and a receiver to receive the reflected signal. A variety of signals can be employed for this purpose, including for example, optical, radio frequency and acoustic.

Because the speed of light is extremely high, it is difficult to make precise measurements using commonplace digital circuits. Typical measurement resolution for low-cost direct TOF systems is on the order of one inch. Indirect TOF systems employ modulation techniques on the transmitted light but are much more complex and expensive. Radio frequency devices suffer from the same challenge due to signals propagating at the speed of light. Also, constraining the propagation direction of radio waves is much more difficult than with light, as is measuring the amplitude of the signal.

The measurement device 100 of the present invention utilizes acoustic waves, which propagate at the speed of sound, which is much slower than the speed of light. This allows for commonplace digital circuits operating at clock rates of 1-50 MHz to provide sufficient temporal resolution.

Ultrasonic frequencies are commonly used in order to avoid interference with audible noises, which propagate more readily than ultrasound. Commonly available transducers include categories operating at frequencies of 20-40 kHz, 200-300 kHz and 1 MHz and higher. For detection, it is far more preferable to have a simple discriminator as the receiver than a DSP correlation technique (as in a matched filter for radar). The optimal discriminator threshold is zero, but in practice this is not possible due to the presence of a noise floor. This disparity creates a phase error in the discriminator as the received signal varies in amplitude (depending on path distance). This effect drives towards use of higher frequencies, where phase error produces less distance measurement error. On the other hand, ultrasound frequencies of 1 MHz and higher are highly attenuated in air.

In a preferred embodiment of the present invention, the measurement device 100 utilizes 300 kHz transducers 103, 104, which are also commercially available. At 300 kHz, for example, 45 degrees of phase error produces a very acceptable 0.006 inch of uncertainty. In alternative embodiments of the invention, transducers having frequencies other than 300 kHz can be utilized.

Piezo ultrasonic transducers 103, 104 are highly resonant in order to maximize their efficacy. When generating a drive pulse, a transducer continues to ring long after its drive is turned off. This "ring down" period prevents the detection of objects closer than the distance sound can travel in this time. The measurement device 100 of the present invention comprises two separate transducers 103, 104 to achieve short-range measurement. A first transducer 103 is provided that is configured to transmit an ultrasonic pulse towards a target, and a second transducer 104 is provided that is configured to receive a reflection of the ultrasonic pulse. The receiving transducer 104 is physically separated from the drive or transmitting transducer 103 and allows for a reduced "ring down" effect. Further, the two transducers 103, 104 are mounted in an acoustically dampening material 112, which limits the excitation of the receiver during the transmit event.

The transmitting transducer 103 may require a drive voltage that is far higher than available from a small number of battery cells (up to 50 V peak to peak). For this reason, a step up transformer may be required. A simple single ended, single transistor driver can be employed to drive the primary side of the transformer. There is a diode path in parallel with the primary for core demagnetization. In order to generate a measurement pulse, the transducer can be driven for three 300 kHz periods.

A receiver circuit includes three stages. The first two stages provide gain and bandpass filtering, producing fourth-order filtering for noise rejection. The gains are 100 and 6.8 for the first and second stages, respectively. The third stage is a discriminator. The threshold is configured to be near zero, with a slight offset for the purposes of noise rejection.

While the TOF of the acoustic wave would appear to be twice the separation distance between the measurement device 100 and the target in one (vertical) dimension, the actual geometry of the pulse transmission is more complex. An example of an ultrasonic pulse transmission (P) from a first transducer 103 to a target surface (e.g., the base surface 201 of an automobile frame 200 or chassis) and the reflection of the pulse to the second transducer 104 is shown in FIG. 3B. The shortest acoustic path, which produces the first excitation at the receiver, is the distance ($D_1$) from the center of the first, transmitting transducer 103 to the target 201, but at a midpoint in the horizontal dimension between the first and second transducers 103, 104. The path traces from this point to the center of the receiving transducer 104. This produces a path distance ($D_1+D_1$) comprised of the two longer sides of an isosceles triangle where the base of the triangle is the center-to-center transducer spacing ($D_2$) and the height ($H_2$) is the true distance from the transducers 103, 104 to the target 201. The measured time (TOF) equates to time it takes the ultrasonic pulse (P) to travel the path distance from the first transducer 103 to the second transducer 104, whereas the user of the device 100 wants to know the true spacing between the ground surface 202 and target surface 201 in the height dimension ($H_1$). The effect of this phenomenon is nonlinear, growing more significant as the height ($H_2$) between the measurement device 100 and the target 201, such as the chassis or automobile frame 200, decreases.

Another source of error is the variation in the speed of sound due to temperature. As the temperature of air increases, the speed at which sound travels through air also increases. This effect is significant, requiring precise temperature compensation. A thermistor 111 is provided adjacent to the transducers 103, 104 to measure the air temperature at the transducers 103, 104. This enables more accurate measurements to be taken than if a single air temperature measurement was taken at one part of the car or based on the ambient air temperature around the car, as the air temperature below one section of an automobile may differ from the air temperature below another section of the car. A temperature sensor can also be employed to measure the circuit board 105 temperature. When the temperature is factored in, the time of flight can be converted into distance.

By measuring the air temperature (T) (in degrees Celsius for example) by a thermistor 111 adjacent to the transducers 103, 104 and the time of flight (TOF) between the transmitting of an ultrasonic pulse (P) from the first transducer 103 to the receipt of the reflection of the ultrasonic pulse (P) from the target surface 201, a basic measurement of the distance ($H_1$) between the target surface 201 and the ground surface 202 can be determined based on the following equations, which can be combined into one or more equations for computation:

$$C_T = 331.3 + 0.606 \times T \qquad (1)$$

$$D_1 = \frac{C_T \times TOF}{2} \qquad (2)$$

$$H_2 = \sqrt{D_1^2 - \left(\frac{D_2}{2}\right)^2} \qquad (3)$$

$$H_1 = H_2 + H_3 \qquad (4)$$

wherein, $C_T$ is equal to the speed of sound (m/s) at the measured temperature T;

$D_1$ is the distance traveled by the transmitted ultrasonic pulse (P) from the center of the first transducer 103 to the target surface 201 and also the distance traveled by the reflection of the ultrasonic pulse (P) from the target surface 201 to the center of the second transducer 104, or defined another way, $D_1$ is one-half the total distance traveled by the ultrasonic pulse and reflection from the first transducer 103 to the second transducer 104;

$D_2$ is the distance between the center of the first transducer 103 and the center of the second transducer 104, which is a known value for the particular measurement device 100;

$H_1$ is the distance from the target surface 201 to the ground surface 202, which for example, corresponds to the chassis height to be measured;

$H_2$ is the distance from the target surface 201 to the first and second transducers 103, 104; and $H_3$ is the distance from the first and second transducers 103, 104 to the bottom surface of the measurement device 100 placed on the ground surface 202.

For a particular measurement device 100, $D_2$ and $H_3$ are constant and known values. Each of the above-referenced measurements and constants can be transmitted to a mobile device or computer for display.

Figure 3A:
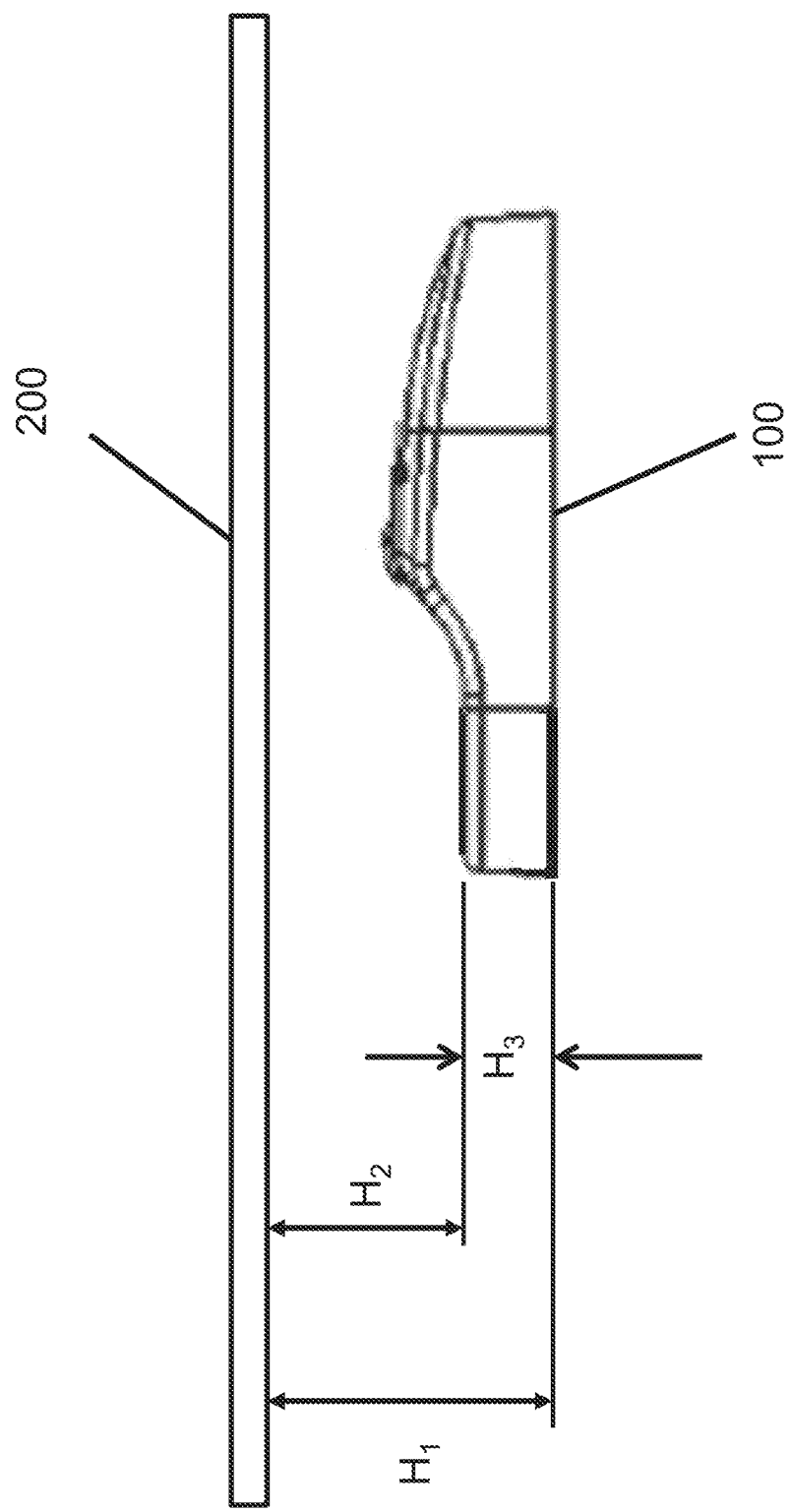
FIG. 3A shows a measurement device for measuring the distance to a target surface according to an embodiment of the invention.
Figure 3B:
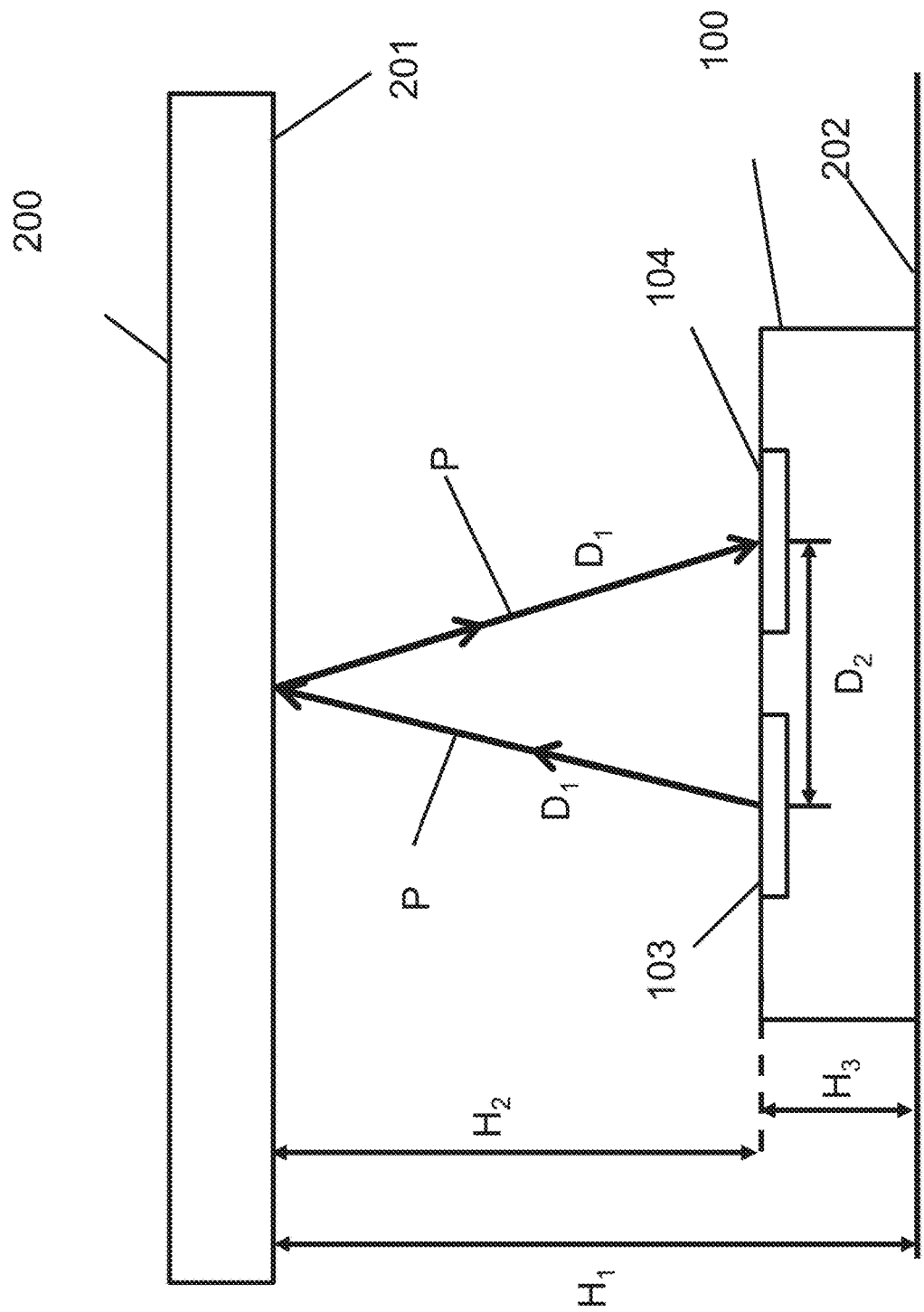
FIG. 3B shows an operation of the measurement device for measuring the distance to a target surface according to an embodiment of the invention.

In the example shown in FIG. 3A, $H_1$ is approximately 2.0 inches, $H_2$ is approximately 1.368 inches, and $H_3$ is approximately 0.632 inches.

The use of the measurement device 100 of the present invention is not limited to the arrangement and orientation shown in FIG. 3A. For example, the measurement device 100 may be placed on the bottom 201 of the automobile frame 200 (or other object) and pointed towards the ground surface 202, in order to make the same determination of the chassis height. In this orientation, the ultrasonic pulse transmitted by the first transducer 103 would be directed towards and reflect off of the ground surface 202 and be received by the second transducer 104.

The determinations of the height of the chassis or other target surface using the measurement device 100 of the invention may include other factors beyond those included in Equations (1)-(4). For example, the air humidity may also be factored into the speed of sound ($C_T$) measurement, as an increase in the air humidity also increases the speed of sound through the air. Another effect which needs to be accounted for in calibration is the attenuation in the received signal as the target is moved further away. Other offsets may include time delays in the circuitry, transducers 103, 104 or software commands as well as the height of the unit enclosure. In order to counteract these repeatable sources of error, the present invention may employ a piecewise linear calibration defined at multiple distances selected so as to best approximate the error curve.

The measurement device 100 of the present invention may include one or more communications architectures, including for example Bluetooth 4.0 (BLE). Alternative embodiments of the invention may utilize other communications architectures known in the art now and in the future, including but not limited to Wi-Fi and other forms of mobile data communication. Each measurement device 100 is configured to communicate with a mobile device or computer, such as a mobile telephone, tablet, laptop or personal computer, via its own link. Therefore, each measurement device 100 comprises a processor and a memory, wherein the memory of each device is stored with identical software. In certain embodiments of the invention, the device does not require repeaters or data aggregation.

The measurement device 100 is controlled by a microprocessor that may comprise a built-in radio frequency transceiver and a separate CPU core for implementing the Bluetooth stack, or other communications architecture. Operation of the device can be controlled by software stored in a memory of the device and configured to be executed by the microprocessor.

The ultrasonic TOF measurement requires good temporal precision and reproducibility. In order to achieve this, measurement operations can be conducted by timer peripherals in the processor rather than by software control, the execution of which is subject to uncertainty. One timer peripheral can control the transmitting transducer, generating a precise 300 kHz pulse train. Upon startup of the transmitter, a secondary timer can be enabled to measure the TOF. After a hold-off period (to account for ring down), a processor interrupt can be enabled, which causes the discriminator output to stop this timer and interrupt code execution. The interrupt handler retrieves the timer value, which provides the TOF time measurement in units of clock periods. This value is converted into a distance using the temperature-compensated speed of sound. The distance can then be corrected using the piecewise calibration figures, using linear interpolation as necessary.

The measurements taken by the measurement device 100 may be triggered by the mobile device or computer operated by the user. For example, the user may position the measurement device 100 in the desired location on the ground underneath the chassis, and initiate a command on the mobile device or computer that is configured to instruct the measurement device 100 to take the appropriate measurements. Alternatively, the measurement device 100 can be configured to trigger the measurements by the user actuating the UI button 110.

In a preferred embodiment, when the measurement device 100 is triggered for a measurement, the device first measures the temperature near the sensors using the thermistor 111 of the measurement device 100. In order to provide a height measurement having increased accuracy, the measurement device 100 takes several measurements. For example, the measurement device 100 may take sixty measurements of the time (TOF) of the ultrasonic pulse between the transmitting transducer 103 and the receiving transducer 104. The TOF measurements are received by the processor of the circuit board 105 of the measurement device 100. The processor may be configured to sort the TOF measurements from longest to shortest, or vice versa, and to further increase the accuracy of the height determination, the processor will exclude a predetermined amount of the longest and shortest TOF measurements. For example, the processor may disregard the ten longest times and the ten shortest times and take an average of the remaining forty TOF measurements. The average time is then turned into a distance using calculations of the speed of sound at the measured temperature, including for example, Equations (1)-(4). The entire measurement process may occur in a relatively short time period, such as approximately two and a half seconds.

The determinations and measurement calculations required by the present invention to determine the height of the automobile chassis (or other object) may be performed entirely by the measurement device 100, or may be performed by a combination of the measurement device 100 and the associated mobile device or computer. For example, the measurement device 100 may comprise a memory stored with instructions including the algorithms for determining the chassis height based on constants and variables including an air temperature (T) and time of flight (TOF) measured by the measurement device 100, and a processor configured to execute the instructions to cause the processor of the measurement device 100 to determine the chassis height. The chassis height determination(s) may be then transmitted from the measurement device 100 to the mobile device or computer for display on the mobile device or computer and/or for further processing and/or storage. Additionally or alternatively, the mobile device or computer may comprise a memory stored with instructions including the algorithms for determining the chassis height based on variables including an air temperature (T) and time of flight (TOF) measured by and received from the measurement device 100 and constants stored in the memory of the mobile device or computer or received from the measurement device 100, and a processor configured to execute the instructions to cause the processor of the mobile device or computer to make the determination(s) of the chassis height.

Figure 4:
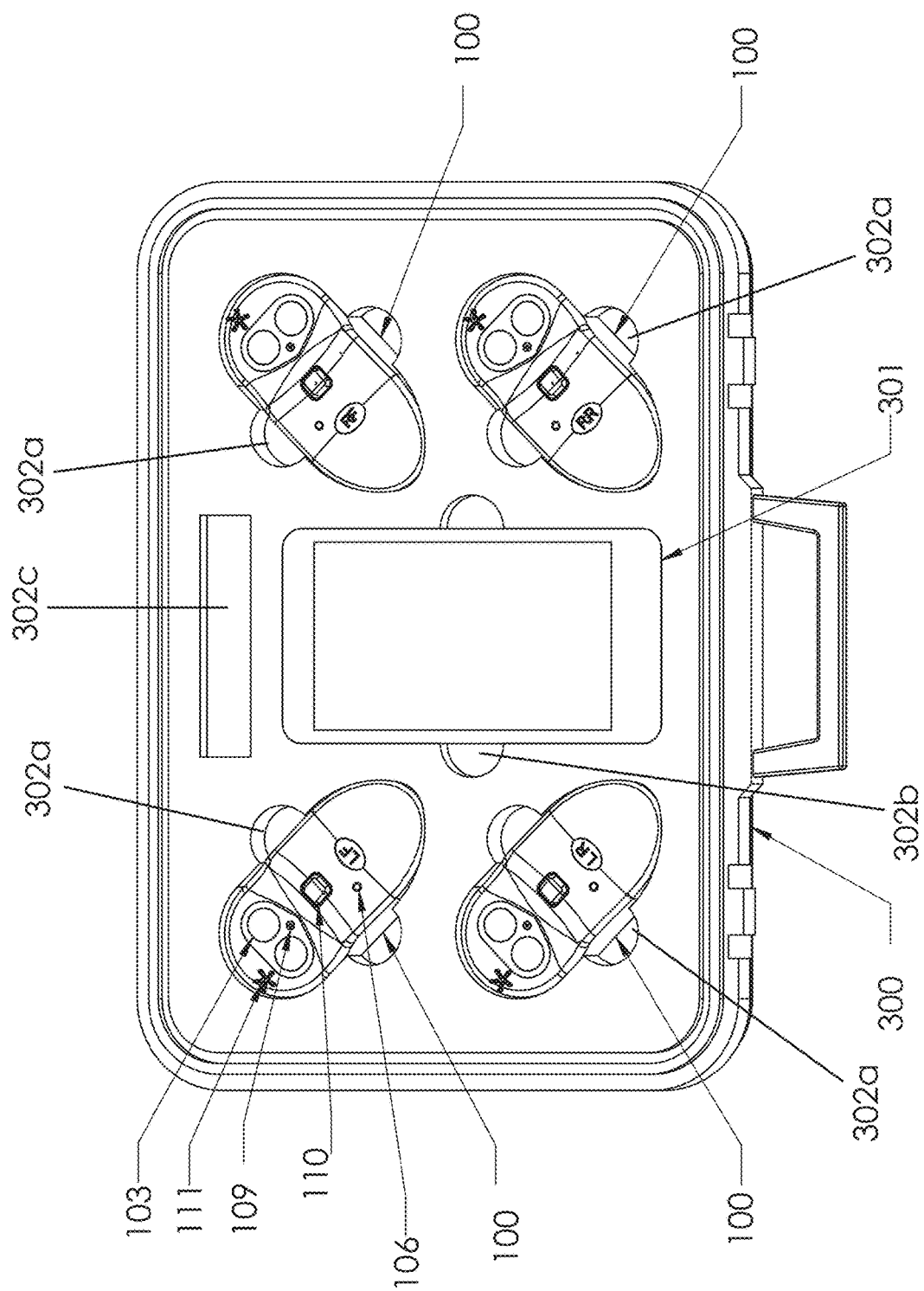
FIG. 4 shows a set of measurement devices according to an embodiment of the invention.

In a further embodiment of the present invention, shown for example in FIG. 4, a system is provided comprising a set of measurement devices 100. In a preferred embodiment, the system comprises four measurement devices 100 as described herein. A measurement device 100 is provided for taking measurements at each of the four corners of an automobile, including the left front ("LF"), right front ("RF"), left rear ("LR") and right rear ("RR"). The system also includes a mobile device or computer 301 that is configured for use with the measurement devices 100. The mobile device or computer 301 may comprise any type of mobile device or computer known in the art, including but not limited to a mobile phone, smart phone, tablet computer, laptop, personal computer or personal digital assistant. The mobile device or computer 301 is configured to receive the measurements from the measurement device 100 and to display the measurements on a display screen. The mobile device or computer 301 may also be configured to enable the user to save measurements in the mobile device or computer memory or remotely for future reference with identifying information about the measurements such as the date, the automobile, the track and the event, and to compare measurements to past or other reference measurements. The mobile device or computer 301 may be configured to trigger the taking of measurement readings by transmitting a signal to any one of the measurement devices 100, or to each of the four measurement devices 100 simultaneously, so that the measurements at each corner of the car can be taken simultaneously.

In certain embodiments of the invention, the system may take the form of a kit comprising the four measurement devices 100 and a case 300 for carrying the devices. The carrying case 300 of the device may in certain embodiments comprise a handle and a plurality of slots 302a, 302b that are sized and shaped to receive the measurement devices 100 and the mobile device or computer 301, as well as a slot 302c for storing any accessories of the system, such as extra batteries or any cables needed for the operation of the mobile device or computer 301. The mobile device or computer 301 of the system can be provided separately from the four measurement devices 100, and configured for operation with the measurement devices 100, such as by downloading a software application for operating the measurement devices 100 to the memory of the mobile device or computer 301.

The Scope of the Invention

It should be understood that, unless stated otherwise herein, any of the features, characteristics, alternatives or modifications described regarding a particular embodiment herein may also be applied, used, or incorporated with any other embodiment described herein. Also, the drawing herein is not drawn to scale.

Although the invention has been described and illustrated with respect to exemplary embodiments thereof, the foregoing and various other additions and omissions may be made therein and thereto without departing from the spirit and scope of the present invention.

What is claimed:

1. A system comprising:
    a plurality of measurement devices for measuring the height of an automobile chassis, each measurement device comprising:
        a housing comprising a circuit board, a processor, a transceiver, and a memory arranged therein;
        a first transducer arranged on a surface of the housing and configured to transmit an ultrasonic pulse towards a target surface;
        a second transducer arranged adjacent to the first transducer configured to receive a reflection of the ultrasonic pulse off of the target surface, wherein the first transducer and second transducer are mounted in and separated by an acoustically dampening material; and
        a thermistor arranged on the surface of the housing adjacent to the first and second transducers and configured to measure air temperature surrounding the measurement device; and
    a mobile device or computer in wireless communication with each of the plurality of measurement devices and comprising a memory, a processor and a display screen;
    wherein the mobile device or computer is configured to wirelessly transmit an initiating command signal to one or more of the plurality of measurement devices to initiate a chassis height measurement;
    wherein the memory of each of the plurality of measurement devices is stored with instructions, which when executed by the processor of the measurement device, cause the processor of the measurement device, upon receipt of the received initiating command signal by the transceiver from the mobile device or computer, to initiate the transmission of an ultrasonic pulse by the first transducer, to measure a time duration between transmitting the ultrasonic pulse by the first transducer and receiving the reflection of the ultrasonic pulse by the second transducer, to obtain a measured air temperature from the thermistor, to determine a distance between a ground surface upon which the device is resting and the target surface based at least upon the measured time duration and the measured air temperature, wherein the distance corresponds to the height of the automobile chassis; and to cause the transceiver to transmit the measured distance wirelessly to the second device;
    wherein the plurality of measurement devices comprises four measurement devices and each measurement device is configured to measure the height of the automobile chassis at one of four corners of the automobile to communicate measurements of the height to the mobile device via wireless communication.

2. The system according to claim 1, wherein the housing of each of the plurality of measurement devices comprises a chamber configured to receive a transducer housing made of the acoustically dampening material and comprising two spaced-apart openings configured to receive the first transducer and the second transducer, such that a perimeter of each of the first transducer and the second transducer are surrounded by the acoustically dampening material.

3. The system according to claim 1, wherein the circuit board of each of the plurality of measurement devices further comprises a light emitting diode visible on a surface of the housing.

4. The system according to claim 1, wherein the housing of each of the plurality of measurement devices further comprises:
    a battery holder configured to receive one or more batteries to power the device, and
    a bottom plate configured to be attachable to the housing and detachable from the housing to provide access to the battery holder and the circuit board.

5. The system according to claim 1, wherein the first transducer of each of the plurality of measurement devices is configured to transmit the ultrasonic pulse at a frequency of approximately 300 kHz.

6. The system according to claim 1, wherein for each of the plurality of measurement devices, the second transducer is physically separated from the first transducer to reduce vibrations from the transmission of the ultrasonic pulse by the first transducer affecting the second transducer.

7. The system according to claim 1, wherein the first transducer of each of the plurality of measurement devices is configured to transmit a predetermined number of ultrasonic pulses,
  wherein for each of the predetermined number of ultrasonic pulse transmissions, the processor is configured to measure the time duration between transmitting the ultrasonic pulse by the first transducer and receiving the reflection of the ultrasonic pulse by the second transducer, to determine a measured time duration for each of the predetermined number of ultrasonic pulse transmissions, and
  wherein the distance between the ground surface and the target surface is determined based on at least a plurality of the measured time durations for the predetermined number of ultrasonic pulse transmissions.

8. The system according to claim 1, wherein for each of the plurality of measurement devices a height of the device between the first and second transducers and a base surface of the device to be placed on the ground surface is no greater than approximately 0.65 inches.

9. The system according to claim 1, wherein each of the plurality of measurement devices is configured to measure the distance between the ground surface upon which the device is resting and the target surface, and the measured distance is at least 1.5 inches.

10. The system according to claim 1, wherein each of the plurality of measurement devices further comprises a laser pointer arranged on a surface of the housing proximal to the first and second transducers and configured to generate a visible laser directed towards the target surface.

11. The system according to claim 1, wherein each of the plurality of measurement devices further comprises a user interface button arranged on a surface of the housing configured to control one or more operations of the device.

12. The system of claim 1, wherein the mobile device or computer is configured to wirelessly transmit the initiating command to each of the plurality of measurement devices substantially simultaneously;
  wherein each of the plurality of measurement devices is configured to transmit the determined distances to the mobile device or computer; and
  wherein the memory of the mobile device or computer is configured to store the determined distances together with associated information including one or more of a date of measurement, a location of measurement and an identification of the automobile.

13. The system of claim 1, wherein each of the plurality of measurement devices is configured to measure the distance within $1/32$ inch or less of accuracy.

* * * * *